Aug. 28, 1962
B. KOCH
3,050,862
SETTING DEVICE FOR BORING OR DRILLING TOOLS
Filed Dec. 2, 1959
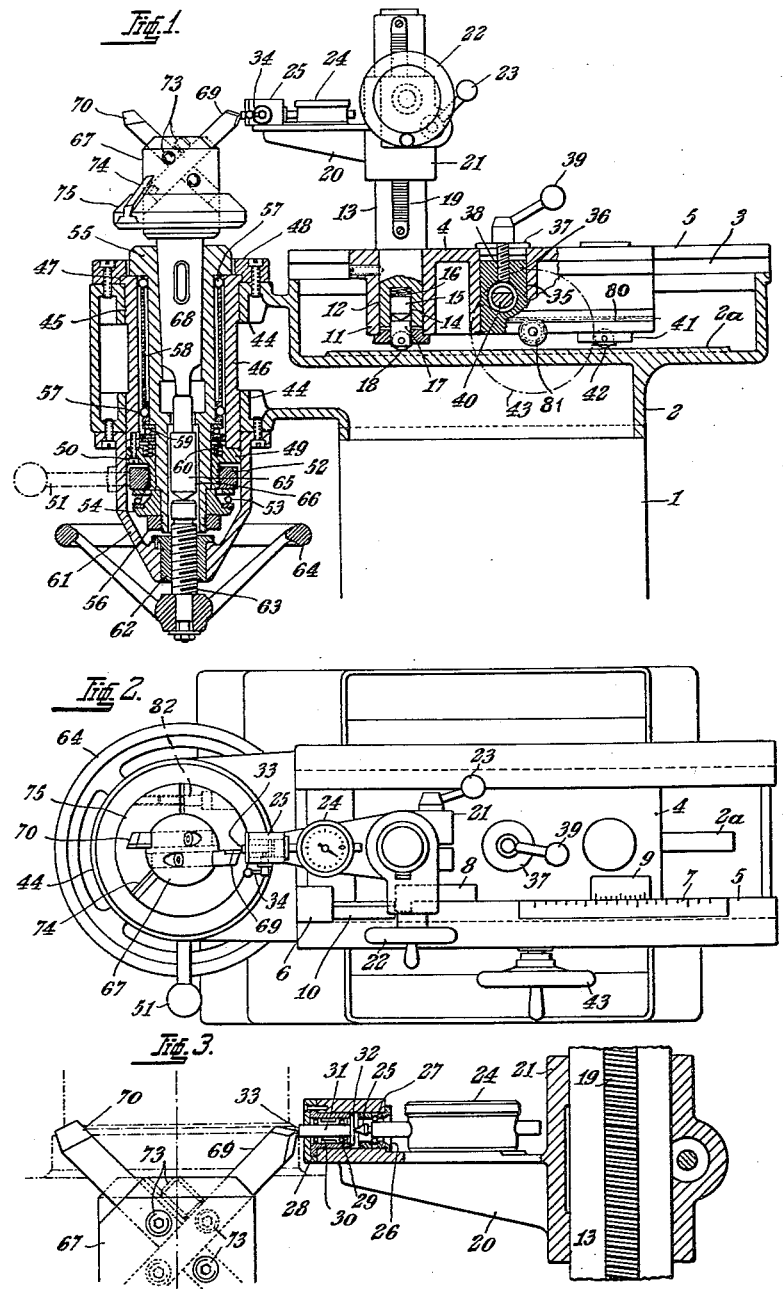
INVENTOR:
BENNO KOCH
BY Geo. M. Strauss
AGT

United States Patent Office 3,050,862
Patented Aug. 28, 1962

3,050,862
SETTING DEVICE FOR BORING OR DRILLING TOOLS
Benno Koch, 58 Rue de Carouge, Geneva, Switzerland
Filed Dec. 2, 1959, Ser. No. 856,684
Claims priority, application Switzerland Dec. 9, 1958
7 Claims. (Cl. 33—185)

This invention relates to a setting device for boring or drilling tools.

The production of exact bores on boring mechanisms and coordinate drilling machines has usually been effected heretofore by the use of precision boring tools. These are furnished with an internal mechanism which, by rotation of a micrometer drum, permits of radial adjustment of the boring tool.

In place of these sensitive and expensive boring tools there may be employed drilling mandrels having two intersecting square openings for reception of the boring tools. The latter are adjusted to the desired radius or diameter with the aid of a special setting device.

The setting device according to the invention is characterised in that firmly mounted on a base there is provided a carriage casing having a carriage which is adjustable by means of end measuring rod and gauge and a guide column firmly mounted therein, which possesses a supporting arm adjustable in height for the reception of a dial gauge, the point of the feeler of which bears against an axially movable sensing means, the projecting edge thereof bearing under the resilient pressure of the feeler of the dial gauge against its guide sleeve, and there being provided on one side on the carriage guide a bearing having a vertical bore, in which there is fitted a bearing sleeve, in which is guided a rotatable and axially shiftable bored spindle, the upper part thereof having a conical portion in which is firmly held the pin or shaft of the boring mandrel, and the lower side of the bearing sleeve being screwed to a flange carrying a threaded ring which, by a movement of the ball handle associated therewith, is moved downwardly, this axial movement being transmitted by way of a ball bearing and an intermediate ring to the spindle and the latter thereby being locked at the upper end against the bearing sleeve, and the lowermost portion thereof acting as a centering means for a cap, which is screwed on to the bearing, and the central bore of which possesses a threaded bush and a rotatable threaded pin, the mandrel being capable by rotation of the handwheel associated therewith of being released by way of an intermediate portion from the spindle, the entire arrangement being such that, in the case of the tool holder with the tools being fitted in the spindle bore, the carriage with the dial gauge set to the desired distance from the axis of the vertical spindle, at first there is effected the setting of one tool, then the spindle is rotated by 180° and the second tool is thereupon set by displacement in the head, in such a manner that it touches the end face of the sensing device, and the tool holder with the tools is now released and fitted in the boring mechanism.

An embodiment of the invention is illustrated by way of example in the accompanying drawing.

FIG. 1 is a vertical section through the horizontal carriage and the vertical spindle with a fitted boring mandrel.

FIG. 2 is a plan view of FIG. 1.

FIG. 3 is a sectional view to enlarged scale of a part of the supporting arm with dial gauge and sensing means and also the mandrel with the fitted boring tools.

The setting device according to FIGS. 1 and 2 is mounted on a base 1. On the latter there is provided the carriage casing 2, in the guides 3 of which there moves the laterally shiftable carriage 4. The upper guide faces of the carriage are covered by the strip members 5 and the carriage is guided without play in the carriage casing 2. Firmly connected to the cover strip 5 is a stop 6 and a gauge 7 for the setting of the carriage 4 (FIG. 2).

Opposite to the stop 6 there are located on the movable carriage 4 a stop 8 and a vernier 9, in such a manner that by the introduction of an end measuring rod 10 between the stops 6 and 8 a certain setting is obtainable immediately.

The carriage 4 is hollow and in the same there is provided a boss 11 having a bore 12, in which is fitted a vertical guide column 13. This column possesses at its lower end a bore 14 in which is fitted to be axially shiftable a guide portion 15, which under the action of the coil spring 16 presses against the slide member 17 having the roller 18. The latter bears against a guide strip 2a on the carriage casing 2. On the projecting portion of the column 13 there is provided in fixed manner a toothed rack 19, and over the same and the column 13 there is provided, so as to be vertically shiftable, the one-sided supporting arm 20 having the boss 21. In the latter there is mounted to engage with the rack 19 a pinion (not shown), with which there meshes on the upper side a worm (not shown), which may be rotated by means of a handwheel 22, so that the supporting arm may be adjusted to a higher or lower position. The ball handle 23 serves to lock the supporting arm after adjustment has been effected. On the supporting arm 20 there is secured a dial gauge 24 with feeler 25. A closure member 26 for the feeler 25 is furnished with a resilient washer 27. The feeler 25 acted upon by the measuring pressure of the dial gauge 24 presses against an axially shiftable sensing means 31 which is mounted in a sleeve 28 by means of two ball bearings 29 and distance bush 30, the inner edge 32 of this sensing means bearing against the sleeve 28.

In this position of the sensing means 31 the distance from an exterior end face 33 of the sensing means 31 up to the axis of the guide column 13 is a constant value. By rotating a small lever 34 furnished with an eccentric pin the sensing means 31 may be retracted until the inner edge 32 thereof bears against the closure member 26.

In the carriage 4 there is furthermore provided a vertical bore 35, in which is fitted to be shiftable therein a slide member 36. The bore is covered on the upper side by a cover member 37, in which is mounted to be rotatable a threaded bolt 38 having a ball handle 39. The slide member 36 is provided with a threaded vertical bore and a transverse bore at the inner end thereof in which member 40 is fitted, the two ends of which are located below the guide 3 of the casing 2. By tightening the threaded bolt 38 the slide member 36 and the transverse member 40 are raised and the two ends are pressed against the guides 3, the carriage 4 with the carriage casing 2 thereby being locked. In a further vertical bore of the carriage 4 there is fitted a cylindrical guide pin 41, in the lower part of which there is mounted a spring-pressed roller 42, which is rotatable in an axially shiftable slide member and likewise thrusts against the guide strip 2a of the carriage casing 2. The carriage 4 relieved by the rollers can be very readily shifted and there is no wear on the sliding faces impairing the accuracy of the setting mechanism. The carriage 4 is displaced by means of the handwheel 43 which rotates a pinion 80 which engages toothed rack 81.

A bearing 44 provided on the carriage casing possesses a vertical bore 45 in which there is fitted a bearing sleeve 46 which by means of the bearing flange 47 is locked by a ring 48 with the bearing 44. The bearing sleeve 46 is connected at its lower end to a flange member 49 by means of screws 50. The flange member 49 has a sleeve portion which carries a threaded ring 52, which is furnished with a ball handle 51 which extends outwardly from the periphery thereof. The ring 52 bears with its lower side against a longitudinal bearing 53. The latter rests on an intermediate ring 54, which is placed on the spindle 55 and is secured by the nut 56 which is threaded onto the spindle. The spindle 55 is centered in the bore of the bearing sleeve 46 by means of two vertically spaced ball bearings 57 and a distance bush 58. In an axial direction the spindle is fixed by means of the two longitudinal bearings 53 and 59, the latter thrusting against the springs 60 provided in the flange 49. By rotating the threaded ring 52 by means of the ball handle 51 the spindle 55 is drawn downwards and locked against the bearing flange 47 of the sleeve 46. Upon counter rotation of the threaded ring 52 the springs 60 press the spindle 55 upwards, the latter being lifted off the bearing sleeve 46 and becoming freely rotatable.

Screwed to the lower side of the bearing 44 is a cap 61, the central bore of which carries a fixed threaded bush 62 and a rotatable threaded pin 63, to the lower end of which there is keyed the handwheel 64, so that by rotation of the handwheel the threaded pin may be axially adjusted. The upper end of the threaded pin bears against an intermediate member 65 in the cylindrical portion of the spindle bore 66. In the upper portion, the spindle bore is constructed in conical form for reception of the mandrel 67, a shaft 68 of which bears against the upper end of the intermediate member 65, in such a way that upon rotation of the handwheel 64 the mandrel 67 is pressed upwardly and can be released from the conical spindle portion.

The mandrel 67 possesses two intersecting square openings staggered in relation to one another in the axial direction for reception of boring tools 69 and 70. After effected adjustment the boring tools are locked in the adjusted position by means of the screws 73.

For the simultaneous chamfering of the bore to be produced there is employed a chamfering tool 74, which is fitted in a slotted ring 75 which may be locked by means of a screw 82.

The setting device is operated in the following manner:

The carriage 4 is first set with the aid of the handwheel 43 by the introduction of an end measuring rod 10 between the two stops 6 and 8, and following thereon is locked by means of the ball handle 39. The distance resulting upon this setting (see FIG. 3) between the end face 33 of the axially shiftable sensing means 31 and the axis of the spindle 55 is somewhat smaller than the radius of the bore to be produced and can be controlled with the aid of the gauge 7. Following thereon there is introduced into the bore of the spindle 55 the mandrel 67 having the boring tools 69 and 70. There now occurs the adjustment in height of the supporting arm 20 with the dial gauge 24, whereupon the supporting arm is firmly clamped by the ball handle 23. The roughing tool 69 is positioned adjacent sensing means 31 and advanced axially until the cutting edge thereof moves into contact with the end face 33 of the sensing means 31. Further axial movement displaces the sensing means, the amount of displacement being transmitted by way of the feeler 25 to the dial gauge 24 where the amount can be read. In similar fashion mandrel 67 is rotated to position in alignment with sensing means 31, the oppositely disposed boring tool 70. The boring tool is then positioned by displacing it axially with the difference that the same is set to a diameter larger than that of the roughing tool 69, but somewhat smaller than the nominal size of the bore to be produced. Both boring tools are then locked by the screws 73 and the mandrel 67 with the boring tools can be ejected from the spindle 55 by rotation of the handwheel 64. The mandrel 67 thus adjusted is fitted in the spindle of the machine tool, for example boring mechanism, to be employed and the piece of work is bored to the prescribed depth and the bore measured.

The mandrel must now again be introduced into the setting device and the cutting edge of the fine boring tool 70 set by sensing the end face 33 of the sensing means 31 to the radial extreme ends thereof. Following thereon the spindle 55 is released by the ball handle 51 and the zero point of the dial gauge scale adjusted to lie below the pointer. This fixes the position of the tool in relation to the sensing means at the zero setting of the dial gauge 24. The screws 73 are released and the boring tool 70 is re-adjusted to any desired amount by directly reading this readjustment amount on dial gauge 24 and again clamped in position. This re-adjustment of the boring tool, which can be read in direct fashion on the dial gauge, permits of an extremely accurate and reliable setting of the mandrel and the boring tools.

What I claim is:

1. A device for setting the position of a tool in an elongated boring mandrel, said mandrel having at least one tool releasably lockably mounted thereon adjacent one end and slidable in a radial direction in respect to the mandrel axis for adjustment on said mandrel, comprising bearing means for rotatably supporting said mandrel with the tool extending upwardly from said bearing means, a measuring apparatus mounted adjacent said bearing means including a carriage shiftable toward and away from said bearing means, a member on said carriage elongated in a direction extending above said bearing means, a measuring gauge supporting arm adjustably positionable along the length of said member, a measuring gauge mounted at the end of said arm including movable sensing means extending outwardly from said arm for positioning in contact with the tool of said mandrel, whereby the position of the end of the tool can be measured by a direct reading on said measuring gauge.

2. A setting device according to claim 1, wherein said bearing means includes means for raising and lowering said mandrel in said bearing means.

3. A setting device according to claim 1, wherein said measuring apparatus includes a carriage casing connected to said bearing means, and said carriage being movable backwardly and forwardly on said casing.

4. A setting device according to claim 3, including means for locking said carriage in position on said carriage casing.

5. A setting device according to claim 4, wherein said measuring gauge includes a horizontally reciprocatable sensing means having an end extending outwardly from said measuring gauge supporting arm for contact with an edge of a tool positioned on the mandrel.

6. A setting device according to claim 1, wherein said bearing means includes a vertically elongated spindle sleeve having a central bore to accommodate the mandrel, and means for supporting said spindle sleeve in an upright position.

7. A setting device according to claim 6, including means for shifting said spindle sleeve axially.

References Cited in the file of this patent

UNITED STATES PATENTS

| 2,375,448 | Talbot et al. | May 8, 1945 |
| 2,775,821 | Eipper et al. | Jan. 1, 1957 |

FOREIGN PATENTS

| 180,741 | Austria | Jan. 10, 1955 |